(No Model.)

S. B. SHAFFER.
SPOKE AUGER.

No. 380,701. Patented Apr. 10, 1888.

Witnesses
Harold Serrell.
Chas. H. Smith

Inventor,
Simon B. Shaffer.
per Lemuel W. Serrell
Atty

UNITED STATES PATENT OFFICE.

SIMON B. SHAFFER, OF EKALAKA, ASSIGNOR TO HIMSELF AND HENRY ELMER GIBB, OF MILES CITY, MONTANA TERRITORY.

SPOKE-AUGER.

SPECIFICATION forming part of Letters Patent No. 380,701, dated April 10, 1888.

Application filed December 1, 1887. Serial No. 256,609. (No model.)

*To all whom it may concern:*

Be it known that I, SIMON B. SHAFFER, of Ekalaka, in the county of Custer and Territory of Montana, have invented an Improvement in Spoke-Augers, of which the following is a specification.

Tubular augers for removing the wood around the outer ends of spokes and thereby forming tenons have been made; but usually these tubular augers are rigid and not adapted to varying sizes of tenons.

My improvements relate to the combination, with the cutter and its stock, of a resisting-gage, parallel-motion bars and clamps, and a prismatic shank, so that the tool can be adjusted to cut different sizes of spoke-tenons; and such tenons will be parallel-sided, and the cutting tool and gage will not bind on the same, but will cut freely.

This improvement is very useful, especially in repair-shops where the tenon has to be cut to suit the size of the hole in the felly, which hole may have become enlarged by the rattling or looseness of a spoke.

Figure 1:
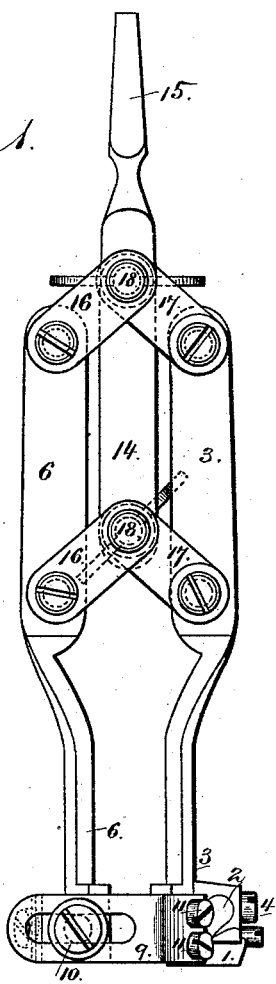
Figure 3:
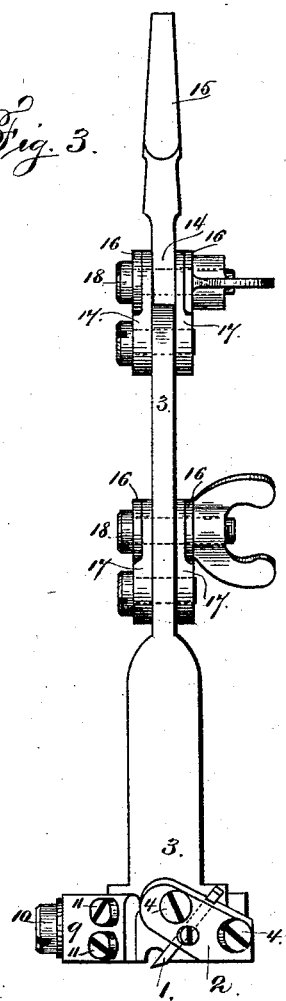
Figure 2:
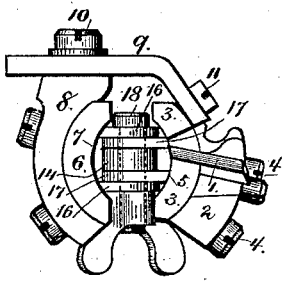

In the drawings, Figure 1 is an elevation of the auger. Fig. 2 is an end view of the same, and Fig. 3 is a side elevation.

The cutter 1 is of an ordinary character, sharpened to cut on the lower and inner edges, and this cutter is received within and supported by the stock 2, that is fastened to the outer surface of the bar 3 by the screws 4. The inner surface, 5, of the bar 3, adjacent to the cutter 1, is concave, as a segment of a cylinder corresponding to the exterior of the tenon to be cut. The bar 6 corresponds to the bar 3, except that it is not notched for the edge of the cutter, and the concave 7 forms a gage, by which the size of the tenon is determined according to the distance between the gage 7 and the cutter 1, and there is a stock-piece, 8, to which the slotted link 9 is held by the screw 10, the other end of this link being attached to the bar 3 by the screws 11. This link holds the gage firmly at the proper distance from the cutter after the parts have been adjusted.

The bars 3 and 6 are parallel at their upper ends, and between them is the bar 14, with a prismatic end, 15, for an ordinary boring-brace or a handle, by which the tool is rotated, and the parallel-motion links 16 17 and the attaching-screws connect the bars 3 and 6 with the bar 14, and allow for the bars 3 and 6 being separated to a greater or less extent, according to the size of the tenon that is to be cut, and the connecting-bolts 18, that unite the links 16 and 17 together and to the bar 14, are provided with thumb-nuts, so as to be easily loosened or tightened, as required in adjusting the tool and in adapting the same to use.

I claim as my invention—

1. The combination, in a spoke-auger, with the cutter 1, of the stock 2 for holding the same, the bars 3 and 6, having the concave parallel faces 5 and 7, the latter forming a gage, and the links and screws adjacent to the faces and near the upper parts of the bars for adjusting the distance between the bars 3 and 6 and holding them parallel to each other, and varying the distance between the cutter and gage for cutting larger or smaller tenons, substantially as set forth.

2. The bar 3, stock 2, and cutter 1, and the clamping-screws, in combination with the bar 6, having a concave gage at the end adjacent to the cutter 1, the connecting-link 9, the bar 14, and prismatic shank, the parallel links 16 and 17, connecting the bars 3, 6, and 14, and the clamping bolts and nuts, substantially as set forth.

Signed by me this 22d day of November, 1887.

SIMON B. SHAFFER.

Witnesses:
G. M. MILES,
E. E. CRAWFORD.